United States Patent [19]

Lannes

[11] Patent Number: 4,797,701
[45] Date of Patent: Jan. 10, 1989

[54] APPARATUS FOR THE REMOTE LOCALIZATION OF RADIOACTIVE SOURCES

[75] Inventor: André Lannes, Viroflay, France

[73] Assignee: Commissariat A L'Energie Atomique, Paris, France

[21] Appl. No.: 813,333

[22] Filed: Dec. 26, 1985

[30] Foreign Application Priority Data

Jan. 4, 1985 [FR] France ................. 85 00088

[51] Int. Cl.$^4$ .................. G03B 17/02; G02B 3/00
[52] U.S. Cl. ......................... 354/288; 350/482
[58] Field of Search ............... 358/110; 354/104, 210, 354/288, 202, 64, 160, 281; 250/475.2, 482.1; 355/1

[56] References Cited

U.S. PATENT DOCUMENTS

| | | |
|---|---|---|
| 631,222 | 8/1899 | Mason ................................. 354/64 |
| 685,463 | 10/1901 | Walkins ............................... 354/64 |
| 2,244,498 | 6/1941 | Miratsky ......................... 354/104 X |
| 2,576,811 | 11/1951 | Schwartz et al. ................... 354/281 |
| 2,751,825 | 6/1956 | Fried .................................. 354/288 |
| 3,086,116 | 4/1963 | Powers ................................. 250/83 |
| 3,107,276 | 10/1963 | Cohen ................................ 358/110 |
| 3,339,070 | 8/1967 | Main .................................. 250/71.5 |
| 3,479,945 | 11/1969 | Koch .................................. 354/160 |
| 3,491,671 | 1/1970 | Engeldrum ........................ 354/288 |
| 4,526,862 | 7/1985 | Pelc .............................. 250/482.1 X |
| 4,589,736 | 5/1986 | Harrigan et al. .................... 355/1 X |

FOREIGN PATENT DOCUMENTS

| | | |
|---|---|---|
| 72279 | 2/1983 | European Pat. Off. . |
| 1511078 | 12/1967 | France . |
| 51072 | 10/1982 | Japan . |

Primary Examiner—Donald A. Griffin
Attorney, Agent, or Firm—Pollock, Vande Sande & Priddy

[57] ABSTRACT

Apparatus for the remote localization or location of radioactive sources having a pinhole camera, whereof the walls constitute a shield for radioactive radiation, said camera having an opening making it possible to introduce a first film able to detect radioactive radiation emitted by said sources and positioned facing the pinhole, a second film sensitive to visible light at the same location as the first and a plug constituting a shield for the radioactive radiation and used for closing said opening during the operation of the apparatus. Preferably, the pinhole is defined by a double cone. Preferably it constitutes a double diaphragm, a small diaphragm permitting the passage of radioactive radiation and light and a large diaphragm only permitting the passage of radioactive radiation.

12 Claims, 2 Drawing Sheets

APPARATUS FOR THE REMOTE LOCALIZATION OF RADIOACTIVE SOURCES

FIELD OF THE INVENTION

The present invention relates to an apparatus for the remote localization or location of radioactive sources.

BACKGROUND OF THE INVENTION

In an area with radioactive risks, it is sometimes necessary to seek and locate the radioactive sources. An attempt is then made to prepare a "map" of the gamma activity of the zone to be monitored by attempting to operate remotely and consequently reducing the risks of contamination for operators.

At present, an apparatus for the remote localization of gamma emitting radioactive sources comprises a gamma ray detector, a distance sensor and a video camera. This apparatus travels on rails and can be moved in accordance with limited angles towards the sources to be located. A converter converts the signals transmitted by the gamma ray detector and distance sensor into colored zones on a control screen. A first image showing the intensity and distribution of the gamma rays emitted by the radioactive sources is therefore formed point-by-point. On said first image is superimposed a second image from the video camera, in order to permit the location of the sources as a function of their intensity in the zone to be monitored.

Such an apparatus is difficult to transport and realize as a result if its weight, complexity and fragile nature, so that the detector and camera have to be manipulated carefully. It is therefore not very suitable for use as an apparatus for monitoring nuclear installations, where radioactive sources can appear at random locations. The time for obtaining the first image is very long and it is consequently difficult to rapidly obtain several photographs. As a result of its complexity, the apparatus is very costly, which makes it impossible to install such an apparatus permanently in each zone to be monitored.

U.S. Pat. No. 3,107,276 describes an apparatus for the localization of radioactive sources designed to be airborne and having a pinhole camera made from a shielding material. This camera is provided with a scintillation converter associated with a cathode ray tube, which converts the image focused by the pinhole into electronic signals with a view to their teletransmission. An independent video camera makes it possible to display the space to be monitored. In such an apparatus, the superimposing of the video image and the image of the radioactive sources is very difficult to bring about on an accurate basis. Moreover, the apparatus has large dimensions, is costly to manufacture and use and is not very suitable for use within a building.

SUMMARY OF THE INVENTION

The present invention relates to an apparatus for the remote localization of radioactive sources making it possible to obviate the aforementioned disadvantages.

More specifically, the present invention comprises a pinhole camera whose walls constitute a shielding for the radioactive rays. This pinhole camera has an opening making it possible to introduce a first film able to detect the radioactive radiation emitted by said sources and positioned in front of the pinhole. Preferably the pinhole camera also has a plug constituting a shield for the radioactive radiation possibly coming from the rear and used for closing and opening during the operation of the apparatus.

Advantageously, a second light-sensitive film is placed in the pinhole camera substantially at the same location as the first film, so as to be exposed by the light penetrating via the pinhole.

Preferably the pinhole camera is provided by a collimator defined by a cone, whose narrowest part constitutes the pinhole and whose opening defines the photographing or shooting field. It is preferable to place the narrowest opening on the side of the entrance for the radiation, so that it is possible to move the radioactive radiation-sensitive film as close as possible to said entrance, which leads to a reduction of the total volume. In an optimized construction, the pinhole camera is defined by a double cone (two cones with the same aperture apposed by the apex), which leads to a reduction in the total volume of the shielding material. Preferably, said pinhole camera constitutes a double diaphragm, a small diaphragm permitting the passage of radioactive radiation and light and a large diaphragm only permitting the passage of radioactive radiation. The small diaphragm is formed by a small diameter hole made in a material which is permeable to radioactive radiation and light-proof, said material being placed in a larger diameter hole made in the walls of said chamber, said hole forming the said large diaphragm.

Advantageously, a third film able to detect the radioactive radiation is disposed in the pinhole camera, so as to be exposed by the radioactive radiation entering by the pinhole, said third film being separated from the first film by an absorbent screen.

Advantageously, an image converter able to transform radioactive radiation into a photon emission making it possible to expose a photographic film, is positioned adjacent to the first film, said converter having a bundle of scintillating optical fibers which are adjacent to one another and converge towards the pinhole of the pinhole camera.

In practice, a film sensitive to visible light, the film able to detect the radioactive radiation, the converter and a reflector are successively placed in the pinhole camera from the pinhole to the opening.

Advantageously, a film which is both sensitive to visible light and to photon emission corresponding to the radioactive radiation converted by the converter, the converter and a reflector are successively positioned in the pinhole camera from the pinhole to the opening.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
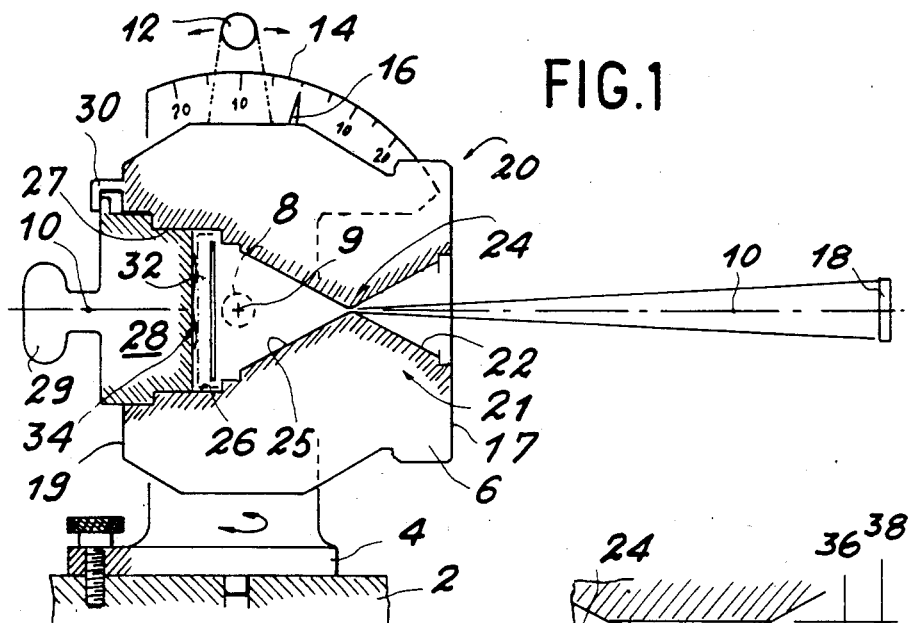
FIG. 1 shows, in longitudinal section, the localization apparatus according to a preferred embodiment of the invention.

The apparatus of the remote localization or location of radioactive sources is shown in FIG. 1 in accordance with a preferred embodiment of the invention.

In the area to be monitored, a frame 2 is placed at the desired location for producing the photographs and said frame is, e.g., mobile. A base 4 is fixed to frame 2 and is used for supporting a body 6 via two horizontal spindles 8. The latter permit the rotation of body 6 about a horizontal geometrical axis 9. Body 6 has a symmetry of revolution about an axis 10. Axis 10 and rotation axis 9 are preferably perpendicular to each other.

In its upper part, body 6 is provided with a handle 12 making it possible to easily orient the body 6 about axis 9. A vertical graduated disc 14 is fixed to base 4 level with one of the sides of body 6. The revolution axis of graduated disc 14 coincides with axis 9. Body 6 is provided with a pointer 16 making it possible to indicate the orientation of body 6 on graduated disc 14. Locking means (not shown) are arranged on either side of the body level with the two spindles 8, in order to ensure the locking of the body in rotation about said axis 9. It is thus possible to orient body 6 and sight the radioactive sources 18, indicate the orientation of body 6 by pointer 16 on graduated disc 14 and find the same position again if, e.g., the apparatus has been moved.

According to a variant, body 6 is not integral with a frame and can be introduced into the zone to be monitored at the end of a support rod, passing through an opening, e.g., into a duct or shaft. Body 6 has a front face 17 to be positioned facing the sources to be photographed, and an opposite or rear face 19.

The apparatus according to the invention has a pinhole camera 20, whereof body 6 constitutes a part of its constituent walls. The camera comprises a collimator 21, the latter being defined by a circular cone 22 whose base is located on front face 17. Collimator 21 is centered on axis 10 of body 6 and the apex of cone 22 constitutes the pinhole 24. Behind the latter is provided a second circular cone 25 in accordance with an angular aperture equal to that of the cone 22. In its widest part, the second cone 25 issues in to a circular film chamber 26 which, like said cone, is centered on axis 10. Film chamber 26 is extended up to rear face 19 by a cylindrical opening 27, which is normally closed by a cylindrical plug 28. A handle 29 and locking means 30 make it possible to insert and then lock plug 28. The apparatus is loaded by placing a film magazine 32 in said film chamber 26. A spring 34 fixed on the inner face of plug 28 makes it possible to engage the magazine 32 against a shoulder formed in chamber 26.

The thicknesses of body 6 and plug 28 are such that they constitute a shield against radioactive radiation. Body 6 and plug 28 are made of a material which greatly attenuates gamma radiation. The alloy Denal has been chosen in preference to lead in order to obtain a smaller volume and consequently a lower weight. The resulting apparatus can easily be carried by a man and can be brought to any place where monitoring is required.

In order to produce a standard photograph of the area to be monitored, it is necessary to bring about an optimum distinction of the details of the installations. However, the smaller the hole or pinhole 24, the greater the sharpness. Thus, the diameter of pinhole 24 is preferably small, e.g., approximately 1/10 mm. It is always possible to adapt the brightness of the zone to be monitored as a function of this diameter and as a function of the sensitivity of the film used. However, an inadequacy of the gamma intensity of the radioactive sources to be located cannot be artificially increased, as for light.

Figure 2:
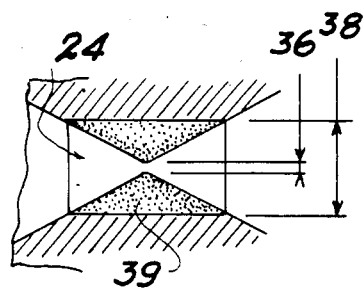
FIG. 2 shows, in section, a larger scale view of the pinhole camera.

In order to solve this problem, the pinhole 24 is formed in the manner shown in FIG. 2. In body 6 is firstly formed a hole, whose diameter 38 corresponds to the optimization on the corresponding photograph of the spot representing a radioactive source, no matter what the energy of the radiation, (e.g., approximately 0.5 mm). This hole is then collimated with a lightweight material 39 of the polyester resin type and which is permeable to radioactive radiation and light-proof. Finally, a small diameter hole 36 is made in this material. In this way a double diaphragm pinhole is obtained, the small diaphragm corresponding to the pinhole for obtaining satisfactory photographs of the installations present in the zone to be monitored, and the large diaphragm to the pinhole for obtaining an adequate spot for locating the radioactive sources.

The film magazine 32 can contain between 1 and 3 superimposed films. As a function of the photographs required, the films are arranged in the following way. Firstly, in order to localize radioactive sources in the zone to be monitored, e.g. two photographs are produced with a film magazine containing a single film for each photograph. The first photograph is obtained with a first film 42 able to detect the radioactive radiation of the radioactive sources to be located. The second photograph is obtained with the second film 40 sensitive to visible light and intended to photograph the zone in a conventional manner. The second film 40 is placed in the magazine substantially at the same location as the first film 42. Three lugs 41 make it possible to determine, without any possible error, the placing of the films in the film magazine 32, thus permitting a subsequent strict superimposition of the two photographs.

In this case, the attempt is made to take two photographs using the same observation point and the same viewing angle corresponding to the position of pointer 16 on graduated disc 14. Obviously the manipulation time is relatively long, positioning errors are possible and the operator is obliged to manipulate in a radioactive zone for reloading the apparatus, which leads to hazards.

Figure 3:
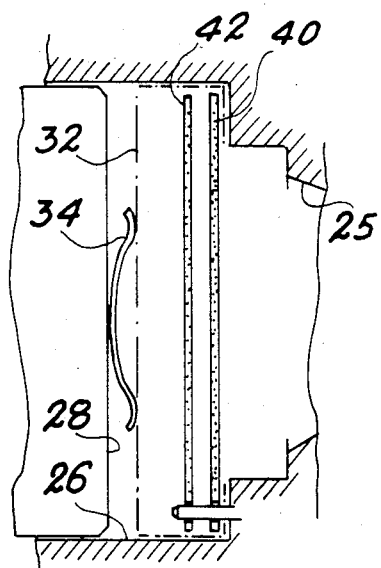
FIG. 3 shows, in section, a larger scale view of the film chamber and the film magazine.

Thus, according to a preferred embodiment of the invention, partly shown in FIG. 3, the two photographs are simultaneously produced with a film magazine containing two superimposed films 40, 42, the gamma radiation-transparent film 40 which is insensitive to said radiation being positioned in front of film 42. This ensures a good positioning correspondence of the two films and easy, fast manipulation.

Once the films 40, 42 have been processed, their superimposition makes it possible to distinguish spots corresponding to radioactive sources in the photographed installations. In this way the elements forming the object of the radioactive activity are located. The optical density and size of the spots make it possible to determine the value of the intensity of the radioactive activity.

Informatics processing of the two images makes it possible to superimpose the two photographs to give a single photograph, directly identifying the radioactive sources. By means of a calibration, another informatics processing of the image of the radioactive sources makes it possible to obtain approximate dosimetry. The results obtained are preferably in the form of colored zones, using standard known procedure.

Figure 4:
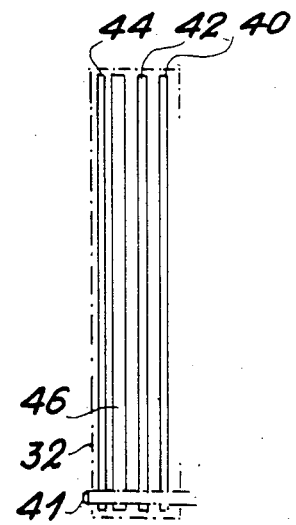
FIG. 4 shows, in section, the film magazine according to a variant of the apparatus according to the invention.

It may also be of interest to determine, by their energy, the nature of the materials forming the radioactive sources. For this purpose, use is made of a magazine with three films shown in FIG. 4. These three films comprise films 40 and 42, as well as a third film 44 able to detect the radioactive radiation and separated from the first film 42 by an absorbent screen 46, and second film 40 still being positioned in front of the first film 42. By comparison of the optical densities of these spots corresponding to the radioactive sources and received respectively by the two films 42 and 44, it is possible to identify the nature of certain of the radioactive sources. For a given absorbent and a given screen thickness, a curve directly gives the energy corresponding to a given ratio of the intensities, measured by the optical densities.

In certain cases, it can be advantageous to place an image converter in the pinhole camera. The converter is, e.g., positioned adjacent to the first film able to detect the radioactive radiation. It makes it possible to convert the radioactive radiation into a photon emission able to expose the first film.

Figure 5:
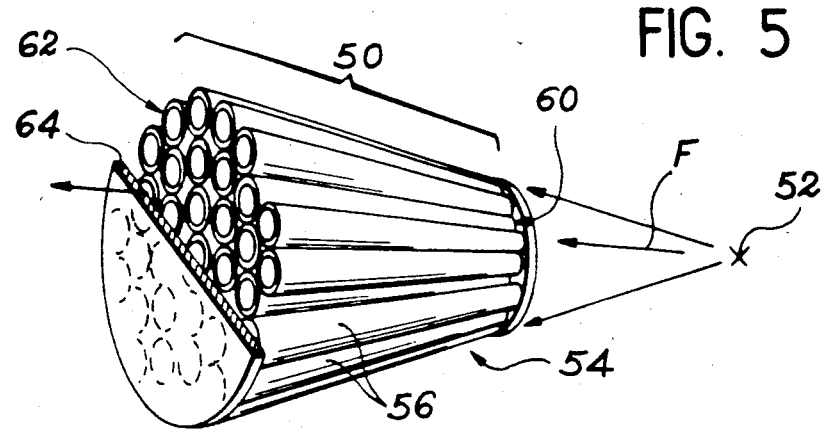
FIG. 5 is a perspective, diagrammatic view of an image converter according to the invention.

An image converter according to the invention is shown in FIG. 5. This converter 50 makes it possible to convert a spacial distribution of an ionizing radiation, e.g., a gamma radiation, whose path is indicated by arrows F, into a visible image, as well as to transmit this image. For example, this gamma radiation comes from a point source 52 constituted by the virtual image of the radioactive sources 18 produced by pinhole 24.

Image converter 50 is constituted by a bundle 54 of scintillating, adjacent optical fibres 56 and which can be made either from glass or a plastics material. These optical fibres 56 are all oriented in a direction geometrically coinciding with the path, indicated by arrows F, of the gamma radiation from source 52. Thus, they converge towards the same point constituted by the point source 52.

Figure 6:
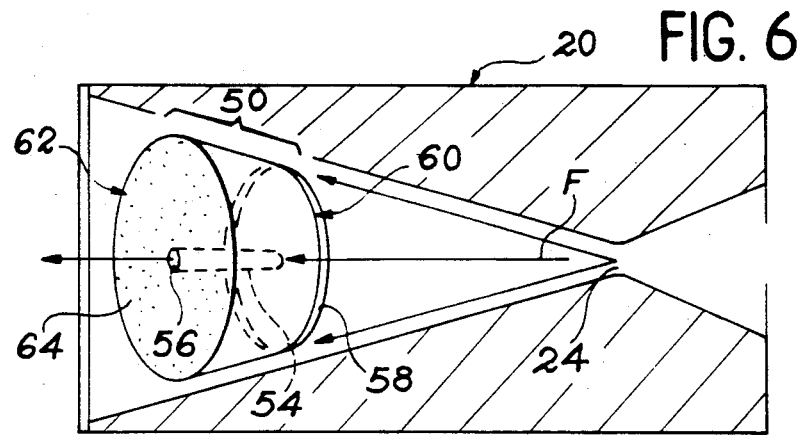
FIG. 6 is a perspective, diagrammatic view of a configuration of the pinhole camera including the converter.

As shown in FIG. 6, the image of the gamma radiation to be detected entering by the pinhole 24 of camera 20 can be obtained on a photographic film 58 located on the end face 60 of the bundle 54 of optical fibers 56 positioned facing the pinhole 24. Film 58 is both sensitive to visible light and to the photon emission corresponding to the radioactive radiation of the radioactive sources to be detected and converted by the converter. The other end face 62 of the bundle is provided with a reflector 64 (e.g., constituted by an aluminum deposit) used for reflecting the image supplied by the converter towards the photographic film 58.

Figure 7:
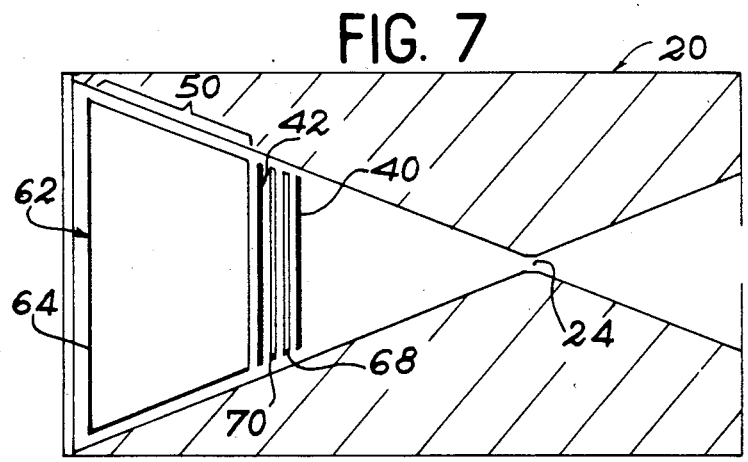
FIG. 7 shows diagrammatically another embodiment of the pinhole camera provided with the converter.

The front position of film 58 makes it possible to simultaneously use the pinhole camera for obtaining a conventional image in visible light of the space to be monitored. The image of the space to be monitored and the image of the radiation are superimposed on the film, so that it is possible to easily define the radioactive sources. If the two images are to be retained on two separate films, while using the image converter 50, it is possible to, e.g., adopt the configuration shown in FIG. 7.

Image convertor 50 is once again located facing the pinhole 24 of camera 20. From pinhole 24 towards converter 50 are successively arranged the visible light-sensitive film 40, a black plastic screen 68, a polished aluminum reflector 70 and the film 42 able to detect gamma radiation. Screen 68 and reflector 70 make it possible to separate the images by absorbing the backscattered radiation. Face 62 of converter 50 is provided with reflector 64.

The angular aperture of collimator 22 is given in exemplified manner in FIG. 1. It is possible to fit a ring at the entrance of said collimator level with the front face 17 of body 6, if it is wished to reduce said angular aperture. The shape of body 6 is such that the thicknesses of the walls are adequate for forming a shield with respect to the radioactive radiation. This shape is optimized to make the apparatus light and portable.

Moreover, plug 28 is not strictly indispensable in the case where the user is certain that no radioactive radiation from the rear is able to expose the sensitive film 42. Moreover, the introduction of the film can optionally take place by a lateral slot, which is preferably closed by an appropriately shaped plug.

The collimator can be defined by a simple cone, whose narrowest orifice is then preferably located on the side of the radiation entrance. Thus, the film sensitive to the radioactive radiation can be moved as close as possible to the entrance, which makes it possible to reduce the volume and therefore the weight.

Finally, the arrangement of the films can be modified as a function of the intended uses and the characteristics of the films used. For example, it is possible to use the configuration of FIG. 7 by adding another film for the gamma radiation between converter 50 and reflector 64. This film will be the equivalent of the third film permitting a comparison of the optical densities.

What is claimed is:

1. A portable apparatus for use within a building for the remote localization of readioactive sources, said apparatus operating by exposure and comprising a pinhole camera whose walls constitute a shield for gamma radiation, said pinhole camera having an opening for the introduction of a first film able to detect gamma radiation emitted by said sources and positioned facing said pinhole, wherein a second light sensitive film is placed in said pinhole camera at substantially the same location as said first film, so that said films are simultaneously exposed by light and gamma radiation entering through said pinhole.

2. A localization apparatus according to claim 1, wherein said pinhole camera has a plug constituting a shield for said gamma radiation and used for closing said opening during operation of said apparatus.

3. A localization apparatus according to claim 1, wherein the pinhole camera is provided with a collimator defined by a cone, whereof the narrowest part constitutes said pinhole.

4. A localization apparatus according to claim 1, wherein said pinhole camera is provided with a collimator defined by a double cone formed from two cones with the same opening apposed by an apex constituting said pinhole.

5. A localization apparatus according to claim 1, wherein the pinhole constitutes a double diaphragm, a small diaphragm permitting the passage of gamma radiation and light and a large diaphragm only permtting the passage of gamma radiation.

6. A localization apparatus according to claim 5, wherein the small diaphragm is formed by a small diameter hole made in a material which is permeable to gamma radiation and light-proof, said material being located in a smaller diameter hole made in the walls of the camera, said hole forming said large diaphragm.

7. A localization apparatus according to claim 1, wherein a third film able to detect gamma radiation is located in the pinhole camera so that it can be exposed by the gamma radiation entering via the pinhole, said third film being separated from the first film by an absorbent screen.

8. A localization apparatus according to claim 1, wherein an image converter, able to convert the gamma radiation into a photon emission making it possible to expose a photographic film, is positioned adjacent to the first film, the converter incorporating a bundle of adjacent scintillating optical fibers converging towards the pinhole of the pinhole camera.

9. A localization apparatus according to claim 8, wherein a visible light-sensitive film, the film able to detect gamma radiation, the converter and a reflector are successively arranged in the pinhole camera, from the pinhole to the opening.

10. A localization apparatus according to claim 8, wherein a film sensitive both to visible light and the photon emission corresponding to the gamma radiation converted by the converter, the converter and a reflector are successively disposed in the pinhole camera, from the pinhole to the opening.

11. A portable apparatus for use within a building for the remote localization of radioactive sources, said apparatus operating by exposure and comprising a pinhole camera whose walls constitute a shield for gamma radiation, said pinhole camera having an opening for the introduction of a first film able to detect gamma radiation emitted by said sources and positioned facing said pinhole, a second light-sensitive film being placed in said pinhole camera superimposed on said first film for taking a simultaneous picture of the same scene.

12. A portable apparatus for use within a building for the remote localization of radioactive sources, said apparatus operating by exposure and comprising a pinhole camera whose walls constitute a shield for gamma radiation, said pinhole camera having an opening for the introduction of a first film able to detect gamma radiation emitted by said sources and positioned facing said pinhole, a second light-sensitive film being placed in said pinhole camera after removal of said first film in the same location as was occupied by said first film, said second film being sensitive to visible light, said camera having an openable shutter enabling gamma radiation and light to enter through said pinhole and selectively expose said films when contained therein.

* * * * *